(12) United States Patent
Baptiste

(10) Patent No.: US 9,425,996 B2
(45) Date of Patent: Aug. 23, 2016

(54) ITERATIVE METHOD FOR SYNTHESIZING DIGITAL FILTERS FOR SHAPING A SIGNAL

(71) Applicant: THALES, Neuilly-sur-Seine (FR)

(72) Inventor: Francois Baptiste, Gennevilliers (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/566,970

(22) Filed: Dec. 11, 2014

(65) Prior Publication Data

US 2015/0163076 A1 Jun. 11, 2015

(30) Foreign Application Priority Data

Dec. 11, 2013 (FR) ..................................... 13 02902

(51) Int. Cl.
*H04L 25/03* (2006.01)
*H04B 3/32* (2006.01)
*H04L 27/01* (2006.01)

(52) U.S. Cl.
CPC ... *H04L 25/03057* (2013.01); *H04L 25/03012* (2013.01); *H04L 25/03853* (2013.01); *H04L 25/03885* (2013.01); *H04L 25/03949* (2013.01); *H04L 27/01* (2013.01); *H04L 2025/037* (2013.01); *H04L 2025/03611* (2013.01)

(58) Field of Classification Search
CPC .................. H04L 25/03159; H04L 25/03834; H04L 25/03006; H04L 25/03197; H04L 25/03885; H04L 25/03949; H04L 25/03057; H04L 25/03012; H04L 25/03853; H04L 27/01; H04B 1/10
See application file for complete search history.

(56) References Cited

U.S. PATENT DOCUMENTS

| | | | | |
|---|---|---|---|---|
| 6,665,308 B1* | 12/2003 | Rakib | ................ | H03M 13/256 348/E7.07 |
| 7,313,181 B2* | 12/2007 | Balamurugan | ... | H04L 25/03038 375/232 |
| 8,571,131 B1* | 10/2013 | Eliaz | ................ | H04L 25/03178 375/285 |
| 2006/0251164 A1 | 11/2006 | Visoz et al. | | |

(Continued)

FOREIGN PATENT DOCUMENTS

EP 0441732 A1 8/1991
WO 0065790 A1 11/2000

OTHER PUBLICATIONS

Toker, C.; Lambotharan, S.; Chambers, J.A., "Joint Transceiver Design for MIMO Channel Shortening," Signal Processing, IEEE Transactions on , vol. 55, No. 7, pp. 3851,3866, Jul. 2007.*

(Continued)

*Primary Examiner* — Chieh M Fan
*Assistant Examiner* — Michelle M Koeth
(74) *Attorney, Agent, or Firm* — Baker & Hostetler LLP

(57) ABSTRACT

An iterative method for synthesizing digital filters comprises the following steps: generation of a transmit filter intended to be applied to a signal to be transmitted; and generation of a receive filter intended to be applied to a received signal. The method comprises the following iteratively executed steps: convolution of the transmit filter and the receive filter in order to generate a transmission filter; determination of a criterion that is representative of the level of intersymbol interference on said transmission filter and whether the level of intersymbol interference is higher than a given level; calculation of an equalizing filter for the intersymbol interference; replacement of the transmit filter with the convoluted transmit filter having the equalizing filter or the replacement of the receive filter with the convoluted receive filter having the equalizing filter.

7 Claims, 2 Drawing Sheets

(56) References Cited

U.S. PATENT DOCUMENTS

2013/0197905 A1* 8/2013 Sugiyama ........... G10L 21/0208
704/226
2013/0215990 A1* 8/2013 Larionov .......... H04L 25/03834
375/285

OTHER PUBLICATIONS

Cenk Toker, et al., "Joint Transceiver Design for MIMO Channel Shortening", IEEE Transactions on Signal Processing, Jul. 1, 2007, pp. 3851-3866, vol. 55, No. 7, IEEE Service Center, New York, NY, USA, XP011185855.

Heung Mook Kim, et al., "Modulation and Pre-Equalization Method to Minimize Time Delay in Equalization Digital On-Channel Repeater", IEEE Transactions on Broadcasting, Jun. 1, 2008, vol. 54, No. 2, IEEE Service Center, Piscataway, NJ, USA, XP011343419.

John Proakis, et al., "Linear Equalization", Digital Communications—Chapter 10: Communication through Band-Limited Channels, pp. 601-612.

John Proakis, et al., "Signal Design for Band-Limited Channels", Digital Communications—Chapter 9: Signal Design for Band-Limited Channels, pp. 540-541.

* cited by examiner

ITERATIVE METHOD FOR SYNTHESIZING DIGITAL FILTERS FOR SHAPING A SIGNAL

CROSS-REFERENCE TO RELATED APPLICATION

This application claims priority to foreign French patent application No. FR 1302902, filed on Dec. 11, 2013, the disclosure of which is incorporated by reference in its entirety.

FIELD OF THE INVENTION

The present invention concerns the field of filters for shaping a signal as part of wireless narrowband transmission between a transmitter and a receiver. The invention applies more precisely to signals modulated using monocarrier modulation.

The invention pertains to an iterative method for synthesizing digital filters for shaping a signal and to filters obtained by applying such a method.

The invention is of particular benefit notably when applied to filters of limited length.

BACKGROUND

In the field of wireless digital communications, a digital signal to be transmitted is modulated and filtered before being transmitted. Traditionally, a first shaping filter is applied to a modulated signal before it is transmitted by radio and a second shaping filter, adapted to suit the first filter, is applied to the signal received by a receiver before it is demodulated.

The shaping filter, applied on transmission, and the adapted filter, applied at reception, need to be compliant with precise spectrum templates meeting numerous constraints. Moreover, the interference between symbols that is associated with the filters needs to be limited so as not to degrade the performances of the demodulation. Moreover, for linear modulations, the ratio between the peak power and the average power needs to be as low as possible in order to allow transmission at an optimum power.

In order to observe all these constraints and obtain good transmission performance, the usual method involves using root raised-cosine filters. These filters have the suitable properties that are required for shaping filters, notably because they allow observance of the Nyquist criterion, which ensures almost total elimination of the interference between symbols.

However, root raised-cosine filters preserve their beneficial properties only when they are synthesized with a large number of coefficients. The reason is that the truncation of the filter to a reduced number of coefficients decreases the frequency selectivity of the filter.

Now, when the capacity of the processor that executes the shaping filtering is limited, the use of filters of great length is prohibited. Even for processors having higher computation capacities, the filtering operation often continues to be an operation that is complex to perform, the complexity being directly proportional to the length of the filter.

There is therefore a need to synthesize shaping filters of short length, that is to say having a small number of coefficients.

One alternative to improve performance involves applying a weighting window to the truncated filter, for example a Blackman window or a Hamming window, but this method generates interference between symbols.

The technical problem that the present invention aims to solve is thus that of finding a method for synthesizing shaping filters that allows the assured production of filters having good properties in terms of interference between symbols and crest factor despite their limited length.

Methods for synthesizing digital filters that are suited to shaping signals to be transmitted are notably described in the patent application publications EP 0441732 and WO 2000065790.

These solutions notably have the following drawbacks. The solution proposed in the application EP 0441732 applies only to multicarrier modulations, while the solution proposed in the application WO 2000065790 requires the use of a particular windowing function.

SUMMARY OF THE INVENTION

The invention proposes a solution to the aforementioned problem that notably involves iteratively compensating for intersymbol interference globally on the transmission filter tantamount to convolution of the transmit filter with the receive filter.

The invention notably has the advantage of allowing fine adaptation of the parameters of the filters to be synthesized on the basis of the constraints of intended template and the constraints pertaining to the lengths of the respective filters on transmission and at reception.

The invention thus relates to an iterative method for synthesizing digital filters comprising the following steps:
The generation of a transmit filter intended to be applied to a signal to be transmitted,
The generation of a receive filter intended to be applied to a received signal,
said method being characterized in that it comprises the following iteratively executed steps:
The convolution of the transmit filter and the receive filter in order to generate a transmission filter,
The determination of a criterion that is representative of the level of intersymbol interference on said transmission filter and whether the level of intersymbol interference is higher than a given level,
The calculation of an equalizing filter for the intersymbol interference,
The replacement of the transmit filter with the convoluted transmit filter having the equalizing filter or the replacement of the receive filter with the convoluted receive filter having the equalizing filter.

According to one particular aspect of the invention, the convolution of the equalizing filter with the transmit filter or the receive filter is chosen on the basis of a desired frequency template for the transmit filter and/or the receive filter.

According to another particular aspect of the invention, the execution iterations are stopped when the level of intersymbol interference is below a given threshold.

According to one particular aspect of the invention, the criterion that is representative of the level of intersymbol interference on the transmission filter is taken to be equal to the ratio between the sum of the absolute values of the coefficients of said filter except the central coefficient and the absolute value of the central coefficient of said filter.

According to one particular aspect of the invention, the equalizing filter is multiplied by a weighting window, the type of weighting window being selected on the basis of the desired speed of convergence of the iterative method.

According to one particular aspect of the invention, the transmit filter and the receive filter are root raised-cosine filters.

According to one particular aspect of the invention, the root raised-cosine filters are multiplied by a weighting window.

The invention likewise relates to a computer program having instructions for executing the iterative method for synthesizing filters according to the invention when the program is executed by a processor and to a transmit filter or receive filter obtained from the execution of the iterative method for synthesizing filters according to the invention.

BRIEF DESCRIPTION OF THE DRAWINGS

Other features and advantages of the present invention will become better apparent upon reading the description that follows in relation to the appended figures, in which.

DETAILED DESCRIPTION

Figure 1:
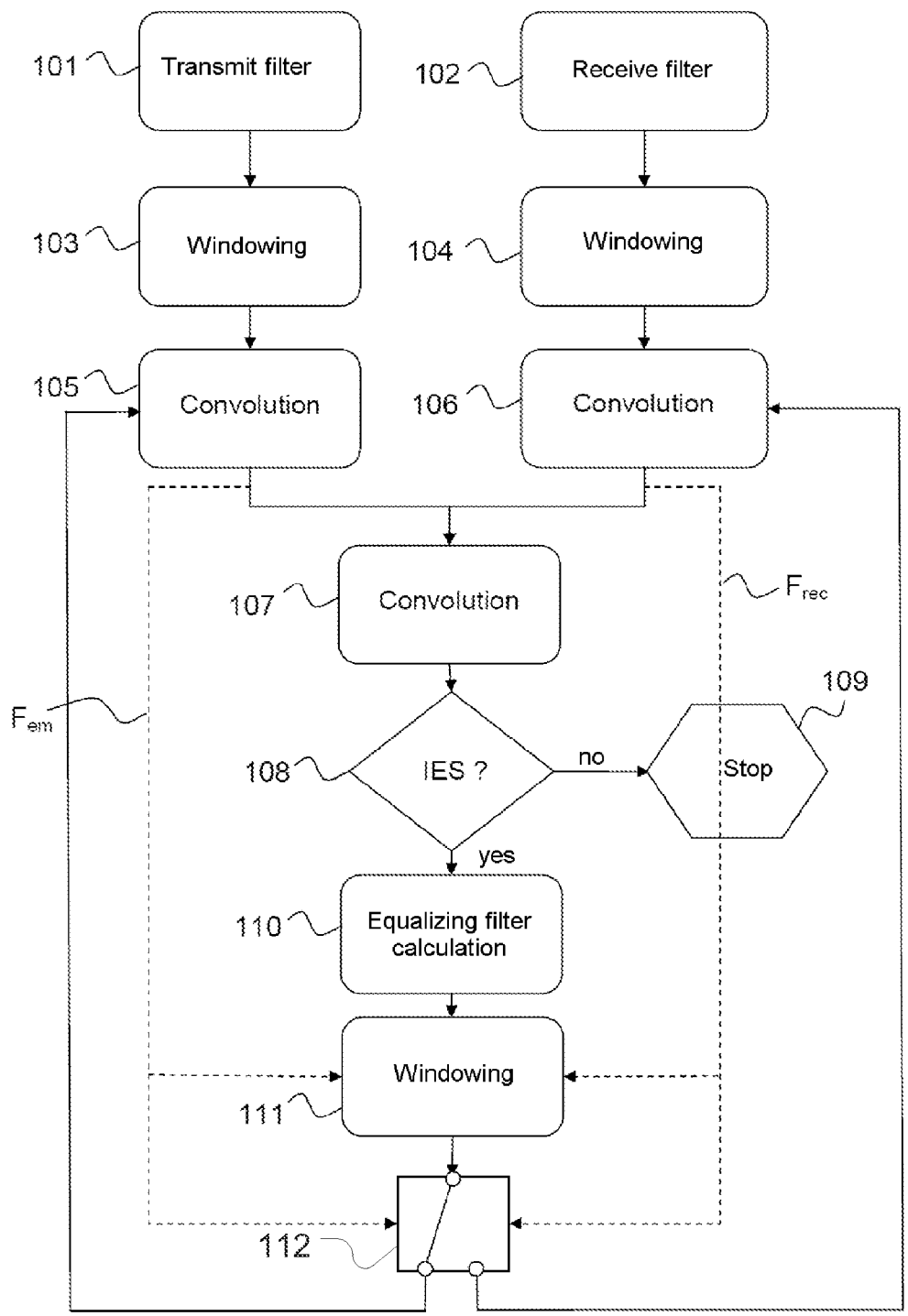
FIG. 1 shows a flowchart for the steps of implementation of the method for synthesizing digital filters according to the invention.

The iterative method according to the invention is initialized with the generation of a first digital transmit filter 101 intended to be applied to a modulated signal to be transmitted and a second digital receive filter 102 intended to be applied to the signal received by a receiver before it is demodulated.

The transmit filter 101 and the receive filter 102 may be root raised-cosine filters as are usually employed in the field of digital communications.

The transmit filter 101 and the receive filter 102 are then truncated to limit their length, and therefore their number of coefficients, so as to satisfy the implementation constraints of the filter operation in the transmitting and receiving equipment.

Optionally, the transmit filter 101 and the receive filter 102 can be multiplied by a weighting window 103, 104, for example a Hamming window or a Blackman window. The operation of truncating the filters can likewise be considered to be multiplication by a rectangular weighting window.

The first iteration of the method according to the invention starts with the convolution 107 of the transmit filter 101 and the receive filter 102, the filters possibly being weighted using a window. The convolution operation 107 allows the overall transmission filter to be obtained, in other words the overall filtering operation that the signal undergoes between the output of the modulator of the transmitting equipment and the input of the demodulator of the receiving equipment.

A criterion 108 that is representative of the level of intersymbol interference on the transmission filter $F_{trans}$ is then calculated. The determination of the level of intersymbol interference is a practice that is well known to a person skilled in the art specializing in digital communications. Intersymbol interference is a distortion phenomenon that has the consequence that, when a signal is filtered by a filter having a non-zero level of intersymbol interference, the current symbol can be polluted by preceding symbols.

A criterion that is representative of intersymbol interference is given by the following relationship, for example:

$$D_{max} = \frac{\sum_{n \neq 0} |r(nT)|}{|r(0)|},$$

where r(nT) are the coefficients of the filter R taken at the symbol times nT.

When the ratio $D_{max}$ is strictly less than 1, the eye diagram for the signal filtered by the filter R is completely open and the intersymbol interference is zero. Conversely, a ratio $D_{max}$ greater than 1 is an indication of the presence of intersymbol interference.

If the level of intersymbol interference in the transmission filter is low, in other words if the criterion 108 that is representative of the level of intersymbol interference is below a given threshold, the method according to the invention is stopped at the current iteration and the synthesized transmit and receive filters are those obtained in the last iteration.

If the level of intersymbol interference in the transmission filter is high, in other words if the criterion 108 that is representative of the level of intersymbol interference is above a given threshold, then an equalizing filter 110 is calculated in order to reduce the level of intersymbol interference. Here again, a person skilled in the art will be able, without difficulty, to calculate a suitable equalizing filter on the basis of general knowledge in the field of digital communications as described, by way of example, in the reference work "Digital communications", John Proakis et al. chapter 10-2 linear equalization.

The equalizing filter 110 is then truncated using a windowing operation 111 in order to limit its number of coefficients to the number of coefficients of the transmit filter 101 or of the receive filter 102.

The truncation of the equalizing filter 110 may notably involve selection of only the first N coefficients of the filter, N being the desired number of coefficients.

Optionally, the windowing operation 110 may likewise involve multiplication of the equalizing filter by a weighting window in order to parameterize the speed of convergence of the iterative method according to the invention. A rectangular window (truncation window) will bring about rapid convergence whereas a weighting window of Blackman or Hamming type will bring about slower convergence.

A routing step 112 then allows orientation of the application of the equalizing filter to the transmit filter or to the receive filter. The routing 112 is parameterized on the basis of the proximity of the frequency response of said filters to an intended template.

If the choice of routing 112 focuses on the transmit filter 101, the latter is convoluted 105 with the equalizing filter 110 in order to obtain a new transmit filter Fem that serves as a point of entry for the next iteration.

Equally, if the choice of routing 112 focuses on the receive filter 102, the latter is convoluted 106 with the equalizing filter 110 in order to obtain a new receive filter Frec that serves as a point of entry for the next iteration.

Upon each iteration, the equalizing filter is applied to one or other of the two filters Fem,Frec and the filter resulting from said convolution replaces the filter obtained in the preceding iteration.

The alternative application of the equalizing filter to the transmission channel or the reception channel allows optimal adjustment of the spectral characteristics of the filters, the frequency selectivity thereof and the crest factor.

Figure 2:
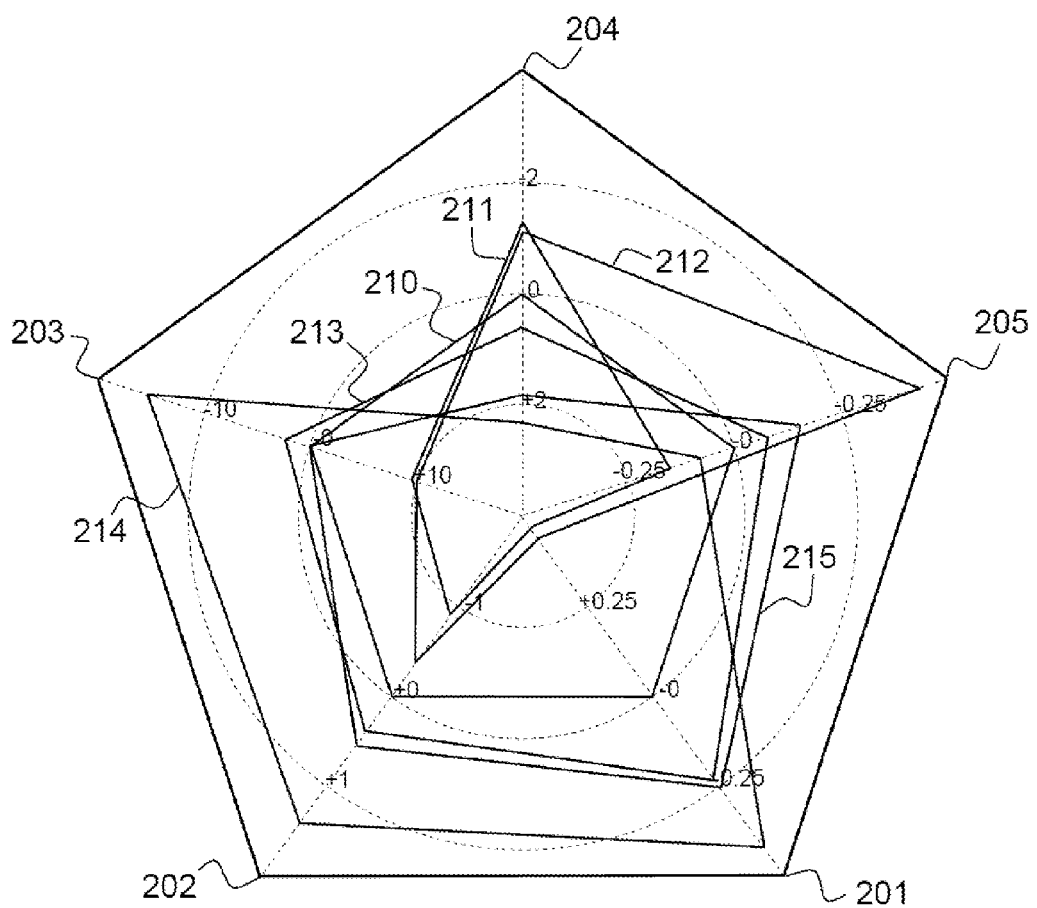
FIG. 2 shows a Kiviat diagram illustrating the comparative performance of digital filters obtained by means of usual methods and of filters obtained by means of execution of the iterative method according to the invention.

FIG. 2 uses a Kiviat diagram to illustrate the performance of digital filters synthesized using a usual method or using the iterative method according to the invention.

The performance of various filters is shown in the Kiviat diagram in FIG. 2 as a function of five characteristics:
the crest factor 201 or "back off",
resistance to temporal desynchronization 202, in other words the minimum temporal desynchronization that brings about a detection error for a symbol filtered at reception,
resistance to adjacent channels 203, in other words the average attenuation of the digital receive filter in an adjacent channel,
the 99% energy band 204, that is to say the minimum frequency band containing more than 99% of the energy of the impulse response of the digital transmit filter,
the signal-to-noise ratio 205 that is necessary in order to obtain a packet error ratio less than or equal to $10^{-2}$ on the received signal.

The characteristics shown in the diagram in FIG. 2 are those of the overall transmission filter constituted by the convolution of the transmit filter and the receive filter. All the transmit and receive filters used are root raised-cosine filters. In the example in FIG. 2, the length of the transmit filter represents five symbols ⅓ and the length of the receive filter represents eight symbols.

The diagram 210 corresponds to a transmit filter and a receive filter with roll-off coefficients of 0.35 multiplied by a rectangular window without application of the iterative method according to the invention.

The diagram 211 corresponds to a transmit filter and a receive filter with roll-off coefficients of 0.25 multiplied by a rectangular window without application of the iterative method according to the invention.

The diagram 212 corresponds to a transmit filter and a receive filter with roll-off coefficients of 0.25 multiplied by a rectangular window with application of the iterative method according to the invention with a first iteration, in which the equalizing filter is applied to the receive filter, and a second iteration, in which the equalizing filter is applied to the transmit filter.

The diagram 213 corresponds to a transmit filter and a receive filter with roll-off coefficients of 0.35 multiplied by a Gaussian window (the standard deviation being equal to 0.56 for the transmit filter and to 1 for the receive filter) with application of the iterative method according to the invention with a first iteration, in which the equalizing filter is applied to the receive filter, and a second iteration, in which the equalizing filter is applied to the transmit filter.

The diagram 214 corresponds to a transmit filter and a receive filter with roll-off coefficients of 0.45 multiplied by a Hamming window with application of the iterative method according to the invention with a first iteration, in which the equalizing filter is applied to the receive filter, and a second iteration, in which the equalizing filter is applied to the transmit filter.

Finally, the diagram 215 corresponds to a transmit filter with a roll-off coefficient of 0.48 multiplied by a Tukey window with a parameter of 0.26 and a receive filter with a roll-off coefficient of 0.35 multiplied by a rectangular window with application of the iterative method according to the invention with a first iteration, in which the equalizing filter is applied to the receive filter, and a second iteration, in which the equalizing filter is applied to the transmit filter.

It is possible to verify generally in the diagram in FIG. 2 that the most favourable configurations spectrally are those that are the most unfavourable temporally, and vice versa. However, beyond this first observation, some configurations behave better than others.

By way of example, the effect of the iterative method according to the invention on filters with roll-off coefficients equal to 0.25 (diagram 212 in relation to diagram 211) is sizeable, and the gain in signal-to-noise ratio is 0.6 dB.

It can likewise be observed that the filter corresponding to the diagram 213 has better characteristics overall than the reference filter corresponding to the diagram 210. The performance in terms of error rate is likewise better. The gain on the crest factor is approximately 0.20 dB.

Finally, the filter corresponding to the diagram 215 allows maximization of the {crest factor, signal-to-noise ratio} pair with a cumulative gain of more than 0.4 dB.

The iterative method for synthesizing digital filters according to the invention can be implemented as a computer program having instructions for the execution thereof. The computer program may be recorded on a recording medium that can be read by a processor.

The invention claimed is:

1. An iterative method for synthesizing digital filters, the method comprising:
    generating an emission filter to be applied to a signal to be transmitted, and
    generating a reception filter to be applied to a received signal,
    wherein the method further comprises the following iteratively executed steps:
    a first convolution of the emission filter and the reception filter to generate a transmission filter,
    determination of a criterion representative of a level of intersymbol interference on the transmission filter, and
    if the level of intersymbol interference is higher than a given level,
    calculating an equalizing filter for the intersymbol interference, and
    replacing, at a next iteration, selectively either the emission filter with a second convolution of the emission filter and the equalizing filter or the reception filter with a third convolution of the reception filter and the equalizing filter,
    wherein a choice between replacing the emission filter with the second convolution of the emission filter and the equalizing filter or replacing the reception filter with the third convolution of the reception filter and the equalizing filter is done based on a proximity of the emission filter or the reception filter to a desired frequency template for the emission filter or the reception filter.

2. The iterative method for synthesizing digital filters according to claim 1, further comprising stopping the iteratively executed steps when the level of intersymbol interference is below a given threshold.

3. The iterative method for synthesizing digital filters according to claim 1, wherein the criterion that is representative of the level of intersymbol interference on the transmission filter is taken to be equal to a ratio between a sum of absolute values of coefficients of the transmission filter except a central coefficient and an absolute value of the central coefficient of the transmission filter.

4. The iterative method for synthesizing digital filters according to claim 1, wherein the equalizing filter is multiplied by a weighting window, a type of weighting window is selected based on a desired speed of convergence of the iterative method.

5. The iterative method for synthesizing digital filters according to claim 1, wherein the emission filter and the reception filter are root raised-cosine filters.

6. The iterative method for synthesizing digital filters according to claim 5, wherein the root raised-cosine filters are multiplied by a weighting window.

7. A non-transitory computer-readable medium including a computer program having instructions for executing the iterative method for synthesizing filters according to claim 1 when the computer program is executed by a processor.

* * * * *